July 31, 1962

A. V. PETREN 3,046,730

VARIABLE AREA EXIT NOZZLE

Filed Sept. 21, 1960

INVENTOR.
ANATOLY V. PETREN
BY
R. E. Geangue
ATTORNEY

July 31, 1962  A. V. PETREN  3,046,730
VARIABLE AREA EXIT NOZZLE
Filed Sept. 21, 1960  3 Sheets-Sheet 2

INVENTOR.
ANATOLY V. PETREN
BY
R. E. Geauque
ATTORNEY

INVENTOR.
ANATOLY V. PETREN
BY
*R. E. Grangue*
ATTORNEY

United States Patent Office 3,046,730
Patented July 31, 1962

3,046,730
VARIABLE AREA EXIT NOZZLE
Anatoly Victor Petren, Canoga Park, Calif., assignor to The Marquardt Corporation, Van Nuys, Calif., a corporation of California
Filed Sept. 21, 1960, Ser. No. 57,490
1 Claim. (Cl. 60—35.6)

This invention relates to variable area exit nozzle for a jet engine and more particularly to a simple and lightweight construction for a variable area, convergent-divergent exit nozzle for a jet engine.

Present types of variable area, convergent-divergent exhaust nozzles incorporate a plurality of nozzle segments which are hinged to the interior of the engine structure for movement relative to the engine to vary the nozzle area. However, such nozzles incorporate nozzle segments which require complicated mechanism for sealing the nozzle against leakage in all of its positions.

In the present invention, the nozzle wall segments are constructed of light gauge sheet spring steel. Each basic segment of the nozzle consists of an L-shaped sheet spring steel member and the foot portion of each member overlaps the foot portion of an adjacent member to produce a sealed wall. The amount of overlap will vary with nozzle area and for any given nozzle area, the overlap will vary along the length of the nozzle. The L-shaped segment members are supported on each side by a sheet spring steel support element and the support elements are secured to hinged support ribs extending along the nozzle. The ribs are moved in and out of the engine opening by an actuating linkage driven by an actuator in order to vary the nozzle area. The resulting bellows type of construction of light gauge metal provides a novel and unique method of obtaining a variable area exhaust nozzle of relatively simple design and of considerably lower overall weight than previous designs.

While the design is particularly suitable for a convergent-divergent nozzle it can also be employed in a solely convergent exit nozzle. In the convergent-divergent form of nozzle, the longitudinal ribs are formed in two sections which are pivotally connected together at the position of the nozzle throat and the actuator linkage can be attached to the aft section.

It is therefore an object of the present invention to provide a variable area exit nozzle constructed in part of lightweight flexible sheet material which permits change in shape of the nozzle while maintaining the nozzle gas tight.

Another object of the invention is to provide a variable area exit nozzle having a plurality of overlapping L-shaped flexible nozzle segments supported by flexible support elements to provide a simple, lightweight structure.

A further object of the invention is to provide a variable area, convergent-divergent exhaust nozzle having lightweight, flexible nozzle segments and support elements, said support elements being connected with longitudinal ribs formed in two parts and pivotally connected end to end at the throat section of the nozzle.

These and other objects of the invention not specifically set forth above will become readily apparent from the accompanying description and drawings in which.

Figures 1, 1A:
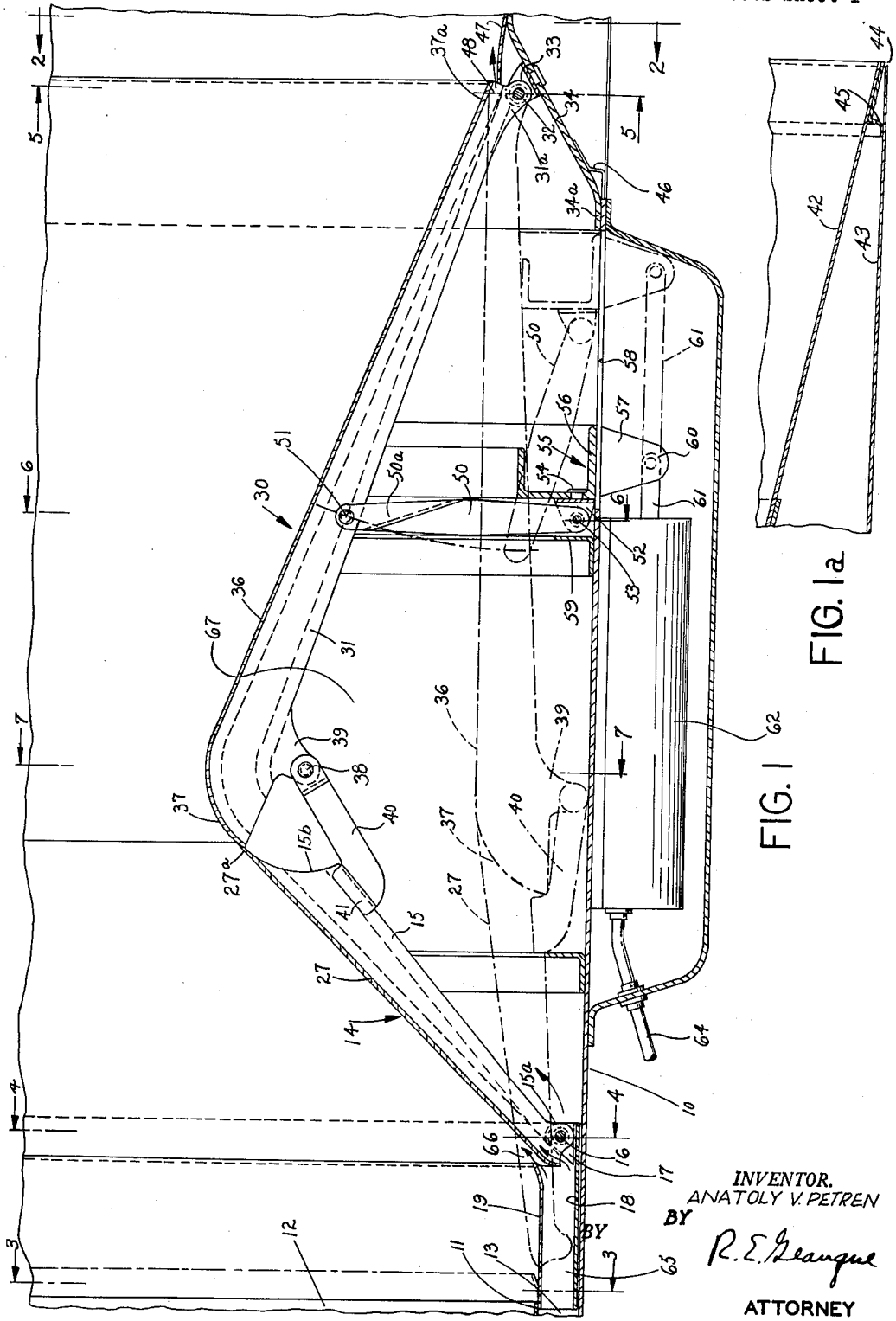
FIGURE 1 is the partial vertical section through the aft portion of a jet engine, showing a section of a convergent-divergent nozzle and nozzle actuator of the present invention.
FIGURE 1a is the aft end section of the nozzle broken away from FIGURE 1 and showing the aft nozzle surface.

Referring to the embodiment of the invention chosen for illustration, a radial section through the convergent-divergent nozzle is shown in FIGURE 1 and the nozzle is contained within the aft end of the main jet engine cowling 10. An inner shroud 11 is located within the engine cowling 10 upstream of the nozzle to define a main engine passage 12 and an annular cooling air passage 13. The passage 13 can be connected with the compressor discharge or with any other suitable source of cooling air.

Figure 4:
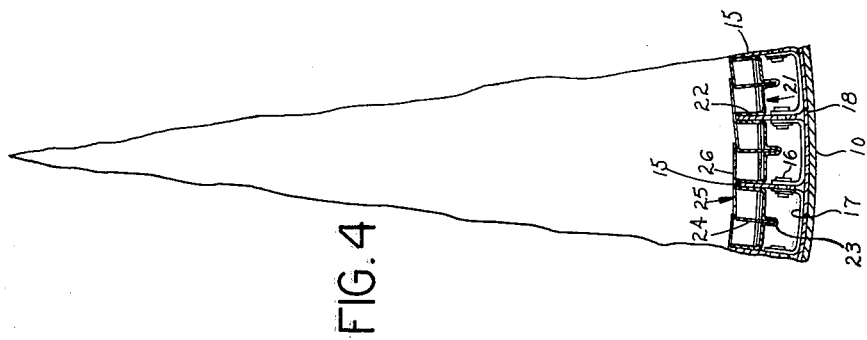
FIGURES 2-7 are partial transverse vertical sections along lines 2—2 through 7—7, respectively, of FIGURE 1 showing the position of the nozzle parts at various locations along the nozzle axis.
Figure 3:
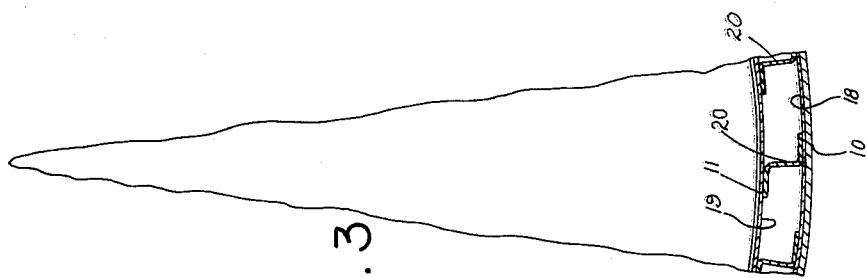
Figure 2:
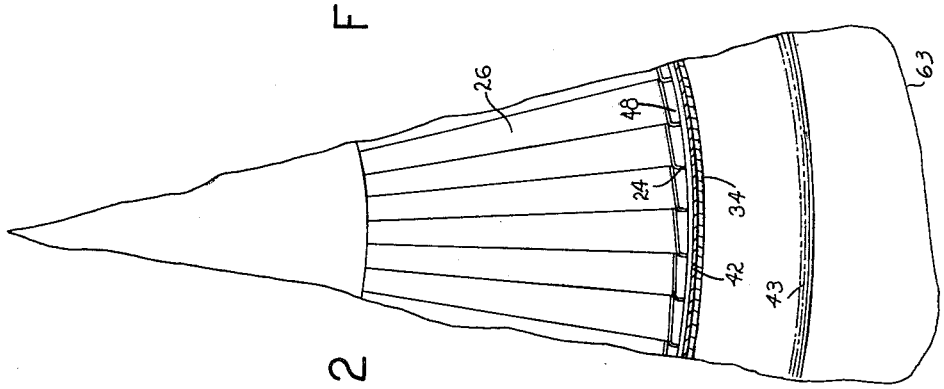

The forward convergent portion 14 of the nozzle comprises a plurality of rearwardly extending ribs 15, each of which has an end 15a containing an opening for receiving a pin 16 (see FIGURE 4). The pins 16 are supported by a plurality of brackets 17 located between the ribs and fastened in a suitable manner, such as by welding, to a cylindrical sleeve 18 fitting snugly against the inner surface of cowling 10. A second sleeve 19 is located inwardly from sleeve 18 and adjacent shroud 11 and the sleeves 18 and 19 are held together by suitable brackets 20 (see FIGURE 3) for sliding movement into the passage 13 upon forward movement of the ends 15a of the ribs.

A support element 21 is located on opposite sides of each rib 15 and each element has an end 22 suitably secured to the rim. Another end 23 of each element 21 is secured to the edge of a leg 24 of one L-shaped segment member 25. Thus, each leg 24 is supported by two elements 21 extending from two adjacent ribs 15 and these elements 21 serve to seal the spaces between ribs against gas leakage. The other leg 26 of each L-shaped segment member 25 overlaps the leg 26 of the adjacent member 25 to provide a convergent nozzle surface 27 sealed against the gas flow through the nozzle.

The rigid legs 24 and 26 of the segments 25 are of such dimensions along the nozzle length as to permit the legs 26 to move towards and away from the inner edge of the ribs 15 as the ribs move relative to each other. Also, the legs 26 will overlap by greater amounts as the ribs move closer together.

Figure 5:
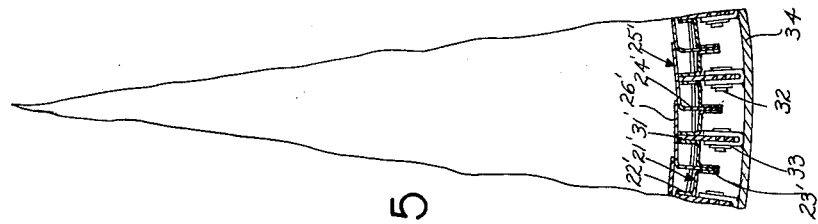

The rear divergent portion 30 of the nozzle comprises a plurality of ribs 31, each of which has an end 31a secured by a pin 32 to a bracket 33 (see FIGURE 5). The brackets 33 are all supported by an annular surface 34 which is secured at end 34a to the end of cowling 10.

A support element 21' is located on opposite sides of each rib 31 and each element has an end 22' suitably secured to an adjacent rib. The other end 23' of each element 21' is secured to the leg 24' of an L shaped segment member 25'. Thus, each leg 24' is supported by two element 21' extending from two adjacent ribs 31 and these elements 21' serve to seal the spaces between ribs 31 against gas leakage. The other leg 26' of each L shaped segment member 25' overlaps the leg 26' of the adjacent member 25' to provide a divergent nozzle portion 35 having a continuous nozzle surface 36 sealed against the gas flow through the nozzle.

Figure 7:
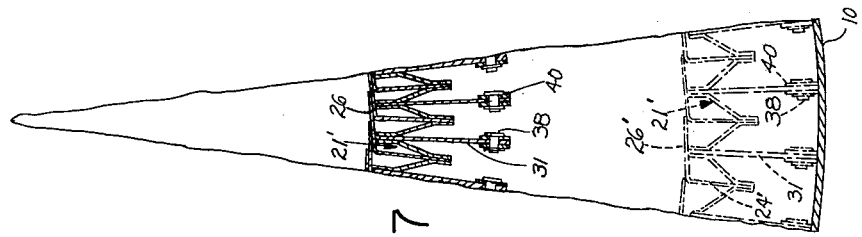
Figure 6:
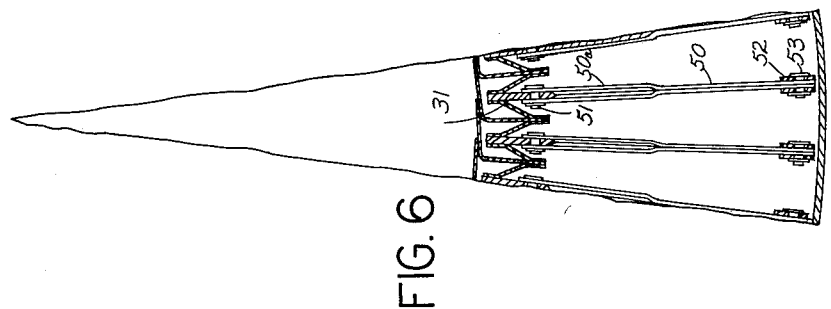

As in the case of elements 21 and segments 25, the elements 21' and the segments 25' are formed of light gauge sheet spring steel and these members are of such shape as to maintain a continuous interior surface 36 from the ends 31a to the ends 31b located at the nozzle throat portion. Referring to the two positions of FIGURE 7, it is pointed out that the legs 24' and 26' are of fixed dimensions and in the lower dotted line position, the legs 26' are spaced somewhat away from the inner edges of ribs 31. However, in the upper full line position, the legs 26' are in engagement with the ribs 31. Since the segments 25' are flexible, the legs 26' can bend outwardly after engagement with the edges of the ribs and in such event, the internal pressure within the engine will hold the overlapping ends of the legs 26' against the adjacent legs 26'. It will be apparent that the legs 26 of the elements 25 of the nozzle portion 14 will act in the same manner.

The throat portion 37 of the surface 36 is overlapped slightly by the end 27a of convergent surface 27. The ends 15b of ribs 15 are arc shaped and since the throat surface 37 is a continuation of this circular arc, the throat surface can be moved about pivot pins 38 located at the center of the arc. Each pin 38 serves to pivotally secure a bracket 39, attached to each rib 31, to a bracket 40 attached to each rib 15 by means of a clamp portion 41.

The aft end of the nozzle is formed of thin sheet metal surfaces 42 and 43 which are connected at end 44 by a bracket 45. The surface 43 is secured to section 34 by a bracket 46 located at the end of cowling 10, and the surface 42 is secured at point 47 to the section 34 and extends to a location slightly below the end 37a of surface 36. Thus, a space 48 for the flow of cooling air exists between the annular surface 42 and the aft end of the surface 36.

In the full line position of FIGURE 1, the convergent and divergent nozzle portions 14 and 30 are shown in the position for obtaining minimum nozzle throat diameter and in the dotted line position of FIGURE 1, these portions are shown in position to obtain maximum nozzle throat diameter. The nozzle portions are moved between the minimum and maximum throat positions by a linkage mechanism comprising a plurality of links 50, each having a split end 50a connected to a rib 31 by a pin 51. The other end of each link 50 is connected to a split bracket 52 by means of a pin 53 and each bracket is secured, by means of a rivet 54, to the side of an annular C shaped actuating member 55. The outer side 56 of member 55 carries a plurality of brackets 57, preferably four in number evenly spaced around the engine, and each bracket projects through a slot 58 in the cowling 10. An annular structure member 59 is located forward of the slots 58 in order to reinforce the cowling.

Each of the brackets 57 is connected by a pin 60 to the shaft 61 of an actuator motor 62 and the motor is secured to the outer surface of the cowling 10 in any suitable manner. The actuator motors and the brackets 57 are enclosed by an annular covering 63 and a pressure fluid line 64 passes through each covering to the motor. When it is desired to vary the throat diameter of the nozzle from the minimum diameter illustrated by the full lines in FIGURE 1, the motors 62 can be actuated by suitable valving to extend the shafts 61 and cause movement of the actuator member 55 in the aft direction. Such movement will cause links 50 to pull the ribs 31 outwardly while pivoting the ribs about the fixed pivot pins 32. The movement of ribs 31 cause the brackets 40 to move the ribs 15 outwardly which results in movement of the sleeves 18 and 19 forwardly into the passages 13. During the movement of ribs 15 and 31, the throat surface 37 will move along the curve ends 15b of ribs 15.

The dotted lines of FIGURE 1 show the position of nozzle portions 14 and 30 for maximum throat diameter and it is apparent that the ends 15a have moved forward towards the cylindrical shroud 11. Also, the brackets 39 on ribs 31 are in engagement with the interior of cowling 10 and the throat surface 37 is adjacent bracket 40. It is apparent that the actuator motor 62 can position the nozzle portion 14 and 30 at any location between the dotted and full line positions of FIGURE 1 to select the desired nozzle configuration and that the support elements 21, 21' and the segment members 25, 25' will continually seal the nozzle surfaces and provide a smooth interior nozzle surface.

In order to continually cool the nozzle, the passage 13 is connected with the engine compressor or other suitable source of cooling gas and this gas is directed into the annular space 65 between the sleeves 18 and 19. A part of the cooling gas will be discharged along the interior surface of the nozzle through the space 66 and the remainder of the gas will pass through space 67 and along the outer surface of the nozzle. The gas is then discharged from the openings 48 into the nozzle jet stream at a location adjacent the forward end of the surface 47. Thus, the flow of cooling gas along the interior and exterior of the nozzle serves to cool these portions and prevent the light gauge sheet spring steel from becoming damaged by the high temperature gases passing through the nozzle.

From the above description, it is apparent that the convergent-divergent, variable area exhaust nozzle of the present invention comprises a relatively simple and lightweight construction and that provisions are made for continually cooling the structure. It is understood that various types of actuators and actuator linkages can be utilized to move the convergent and divergent portions of the nozzle and that the nozzle is suitable for use in a variety of jet engines. Various other modifications are contemplated by those skilled in the art without departing from the spirit and scope of the invention as hereinafter defined by the appended claim.

What is claimed is:

A convergent-divergent, variable area exhaust nozzle for a jet engine comprising a forward convergent portion and a rearward divergent portion located on opposite sides of the nozzle throat, means for hinging said portions together at substantially the throat position to permit movement of the throat portion inwardly and outwardly to vary the throat area of the nozzle, pivot means for pivotally connecting the end of one of said portions away from said throat to the engine structure, each of said nozzle portions comprising a plurality of ribs extending longitudinally of the engine and spaced apart in substantially radial planes, flexible sealing means connected between adjacent ribs, an L shaped member secured to each of said sealing means at the end of one leg of the member so that said one leg extends between adjacent ribs in a substantially radial direction, the other leg of each member closely overlapping an adjacent member to form the surface of the nozzle portion, said sealing means comprising a pair of sealing support elements each having one end connected to the inner edge of one of said ribs and the other end connected to the outer edge of said one leg of said L shaped member and being flexible to permit change in spacing between said ribs, and actuator means connected to one of said nozzle portions for positioning said portions to provide a desired nozzle configuration.

References Cited in the file of this patent

UNITED STATES PATENTS

| | | |
|---|---|---|
| 2,066,544 | Shaw | Jan. 5, 1937 |
| 2,625,008 | Crook | Jan. 13, 1953 |
| 2,693,078 | Laucher | Nov. 2, 1954 |
| 2,770,944 | Jordan | Nov. 20, 1956 |
| 2,821,350 | Smurik | Jan. 28, 1958 |
| 2,858,668 | Kelley | Nov. 4, 1958 |
| 2,999,354 | Gallo | Sept. 12, 1961 |

FOREIGN PATENTS

| | | |
|---|---|---|
| 839,230 | Great Britain | June 29, 1960 |